United States Patent
Häussler et al.

(10) Patent No.: US 6,328,120 B1
(45) Date of Patent: Dec. 11, 2001

(54) STAIR CLIMBING VEHICLE

(75) Inventors: Charis Häussler, Linkenheim-Hochstetten; Manfred Selig; Rudolf Ullrich, both of Eggenstein-Leopoldshafen, all of (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 09/694,242

(22) Filed: Oct. 23, 2000

(30) Foreign Application Priority Data

Nov. 16, 1999 (DE) ................................................ 199 55 199

(51) Int. Cl.⁷ .................................................. B62D 51/06
(52) U.S. Cl. ..................... 180/8.3; 180/8.2; 280/DIG. 10
(58) Field of Search ................................ 180/8.1, 8.2, 8.3, 180/8.4, 8.5; 280/5.2, 5.32, DIG. 10

(56) References Cited

U.S. PATENT DOCUMENTS

| | | | |
|---|---|---|---|
| 2,641,325 | * | 6/1953 | Hoffman et al. ....................... 180/8.2 |
| 2,701,005 | * | 2/1955 | Bennett et al. ........................ 280/5.3 |
| 3,269,475 | * | 8/1966 | Joslyn ................................... 180/8.2 |
| 4,266,627 | * | 5/1981 | Lauber .................................. 180/8.3 |
| 4,569,409 | * | 2/1986 | Kluth ................................... 180/8.2 |
| 4,932,491 | * | 6/1990 | Collins, Jr. .......................... 180/9.32 |
| 5,513,716 | * | 5/1996 | Kumar et al. ......................... 180/8.3 |

FOREIGN PATENT DOCUMENTS 52-44933 * 4/1977 (JP) ...................................... 180/8.2

* cited by examiner

*Primary Examiner*—Daniel G. DePumpo
(74) *Attorney, Agent, or Firm*—Klaus J. Bach

(57) ABSTRACT

In a stair-climbing vehicle for negotiating steps, ledges and stairs comprising a vehicle body having wheel support arms mounted thereon at opposite sides and in spaced relationship so as to be pivotable about a wheel support arm shaft and wheels rotatably mounted on the free ends of the wheel support arms, climbing arms are supported on the vehicle pivotable about the pivot axes of the support arms. The climbing arms are linearly extendable for moving the wheels from one step to the next, one wheel, one wheel support arm and one climbing arm forming together a stair climbing module.

9 Claims, 6 Drawing Sheets

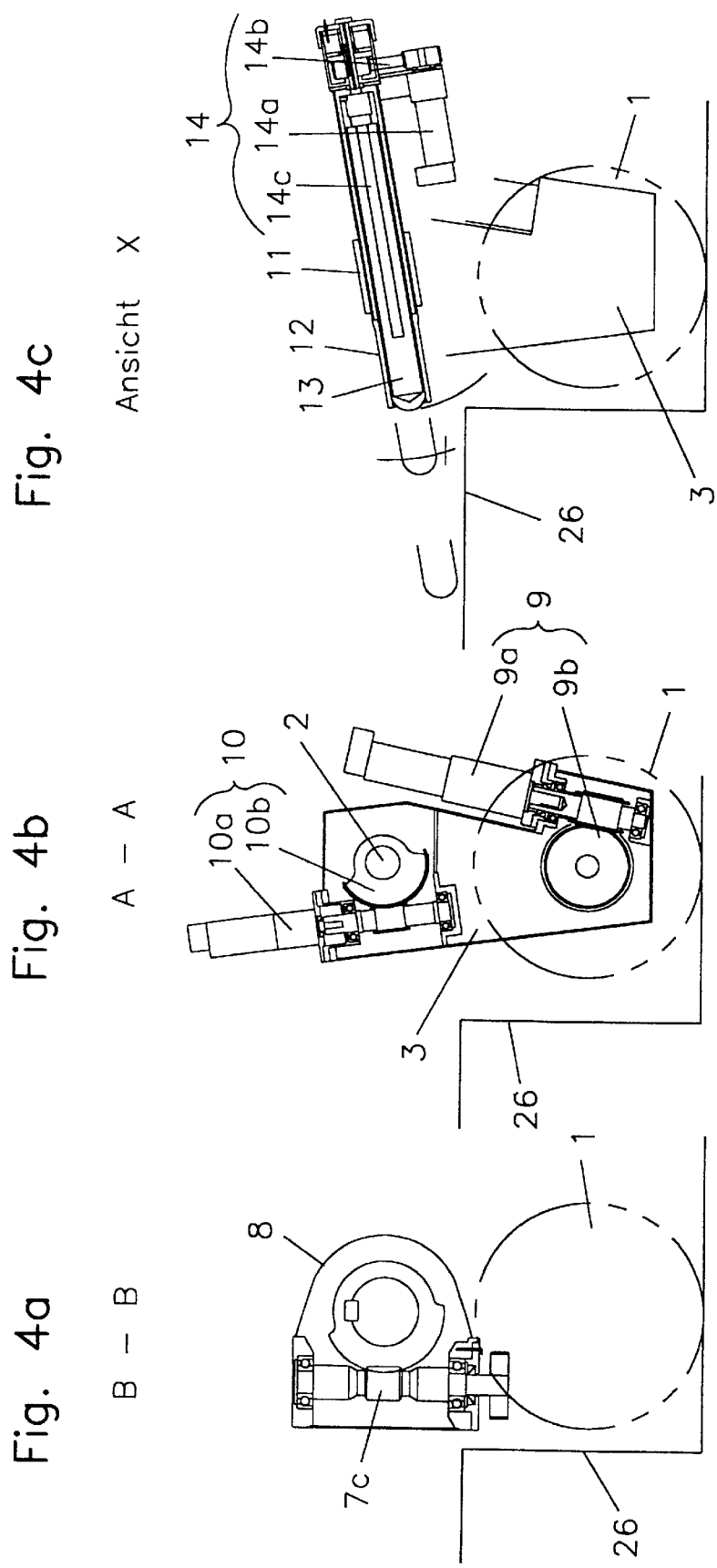

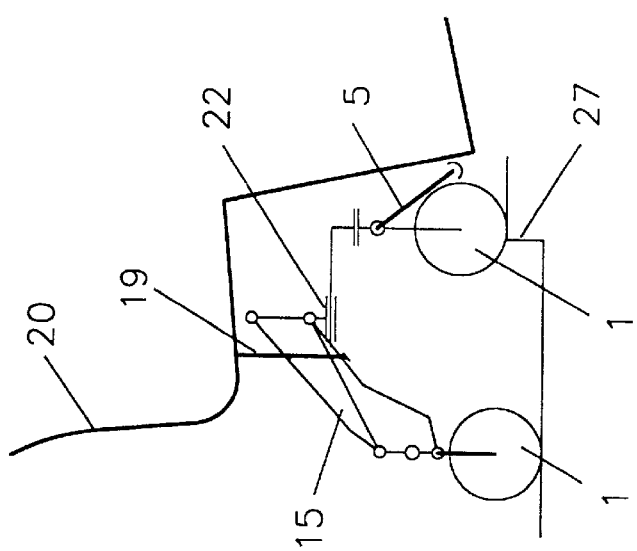
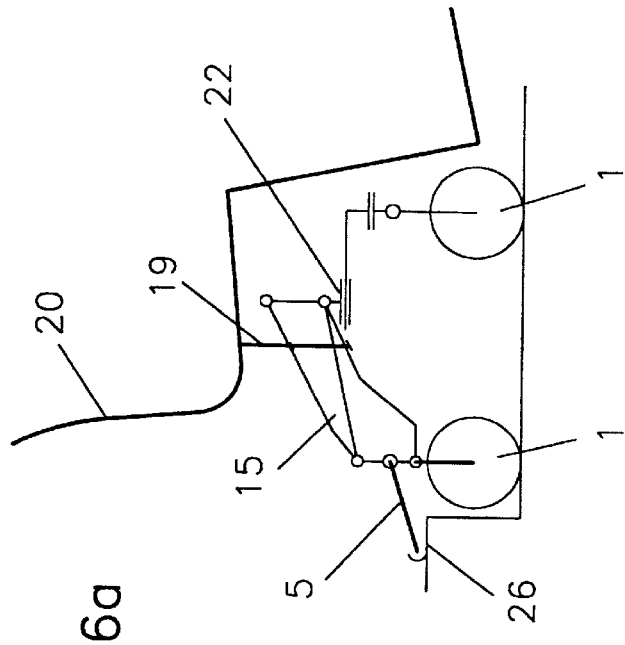
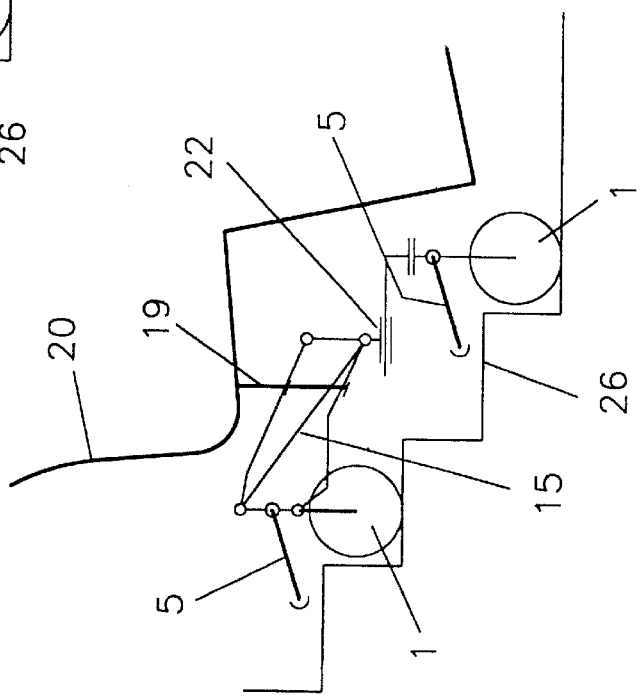

STAIR CLIMBING VEHICLE

The invention resides in a stair-climbing vehicle for negotiating steps, ledges and stairs with a vehicle body having four wheels supported on climbing arms, which are pivotally mounted on the sides of the vehicle body.

Stairs, steps and ledges are obstacles, which are hard to overcome for wheeled vehicles. The use of wheeled vehicles for handicapped persons under rehabilitation or medical care substantially restricts the individual movability of the persons in need of such vehicles. The object for vehicles to overcome such obstacles is therefore not new so that, over the years, numerous vehicle concepts for negotiating steps have been developed.

U.S. Pat. No. 5,513,716 discloses a wheelchair with four wheels and two climbing arms which can lift the axes of the wheelchair over a step. The described lifting arms are mounted at each side of the wheelchair frame near the center axis of gravity between the two axes such that they are pivotable toward the front and the rear. The climbing arms are neither extendable nor retractable, but they have a joint at the center thereof about which the climbing arms can bend. When operated on level surfaces, the wheelchair described therein is driven by the two rear wheels. For overcoming a step, the front wheels are first moved close to the step the climbing arms are then pivoted in front of the vehicle onto the step and the front of the vehicle is raised and the front wheels are moved onto the step.

When the front axle is disposed on the step, the climbing arms are pivoted behind the vehicle and the second axis is lifted onto the step.

It is the object of the present invention to provide a stair-climbing vehicle which, in contrast to the state of the art, can adapt to different stair or step geometries and which can lift at the same time all four wheels for negotiating steps.

SUMMARY OF THE INVENTION

In a stair-climbing vehicle for negotiating steps, ledges and stairs comprising a vehicle body having wheel support arms mounted thereon at opposite sides and in spaced relationship so as to be pivotable about a wheel support arm shaft and wheels rotatably mounted on the free ends of the wheel support arms, climbing arms are supported on the vehicle so as to be pivotable about the pivot axes of the support arms. The climbing arms are linearly extendable for moving the wheels from one step to the next, one wheel, one wheel support arm and one climbing arm forming together a stair climbing module.

Below, the stair-climbing vehicle according to the invention will be described in greater detail on the basis of the accompanying drawings showing a particular embodiment of the vehicle.

BRIEF DESCRIPTION OF THE DRAWINGS

FIG. 4a is a sectional view of the transmission housing taken along line A—A of FIG. 3, FIG. 4b is a sectional view of the transmission housing taken along line A—A of FIG. 3 showing the wheel arm pivot drive, FIG. 4c is a sectional view taken in the direction x as indicated in FIG. 3 showing the climbing arm with the drive unit for the extension of the arm, FIGS. 6a–6c show, in principle, the stair-climbing vehicle in various climbing positions.

DESCRIPTION OF A PREFERRED EMBODIMENT

Figure 1:
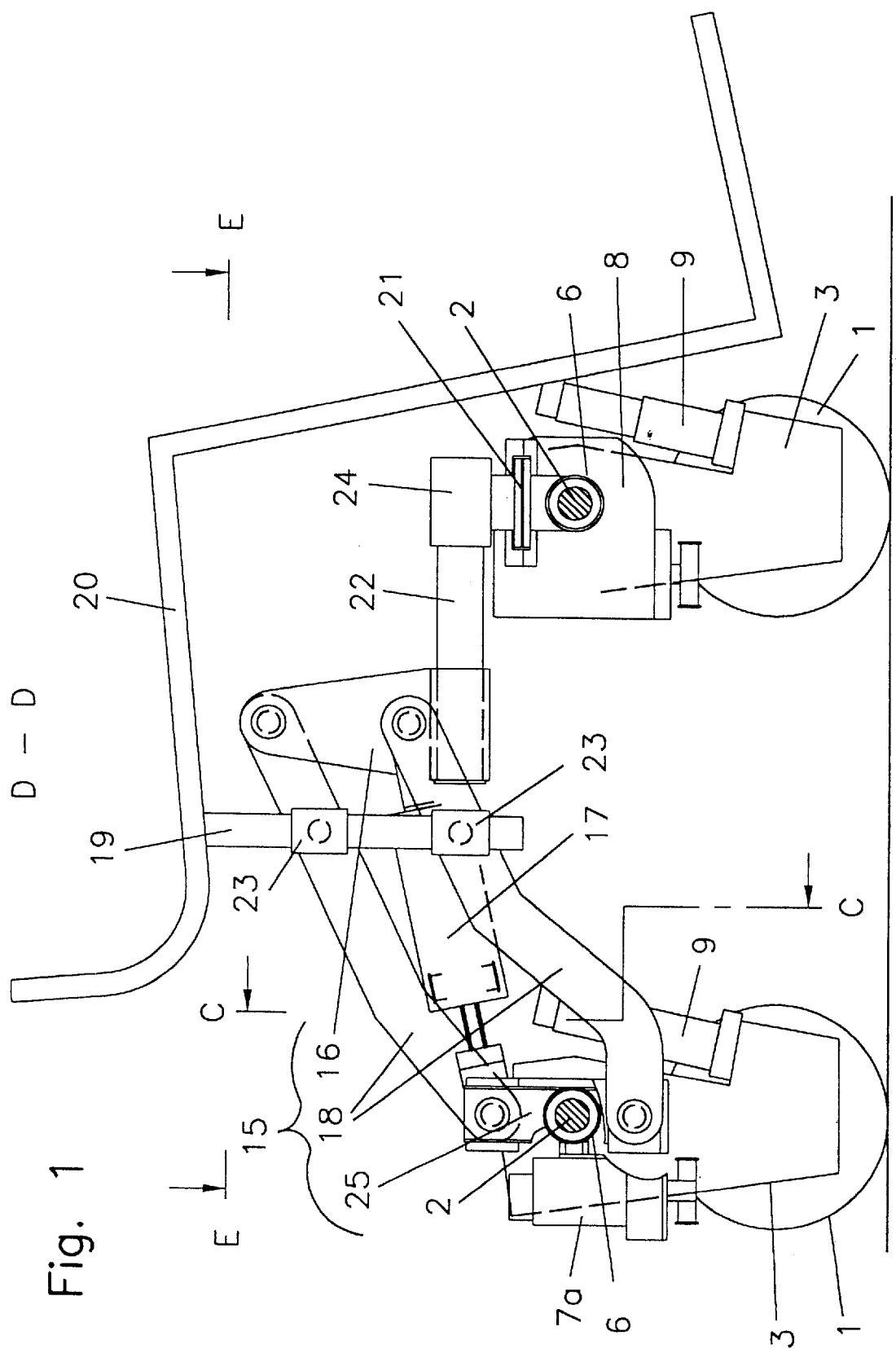
FIG. 1 is a side view of the stair-climbing vehicle according to the invention (View D—D of FIG. 3, FIG. 2 is a top view of the stair-climbing vehicle (View E—E of FIG. 1).
Figure 2:
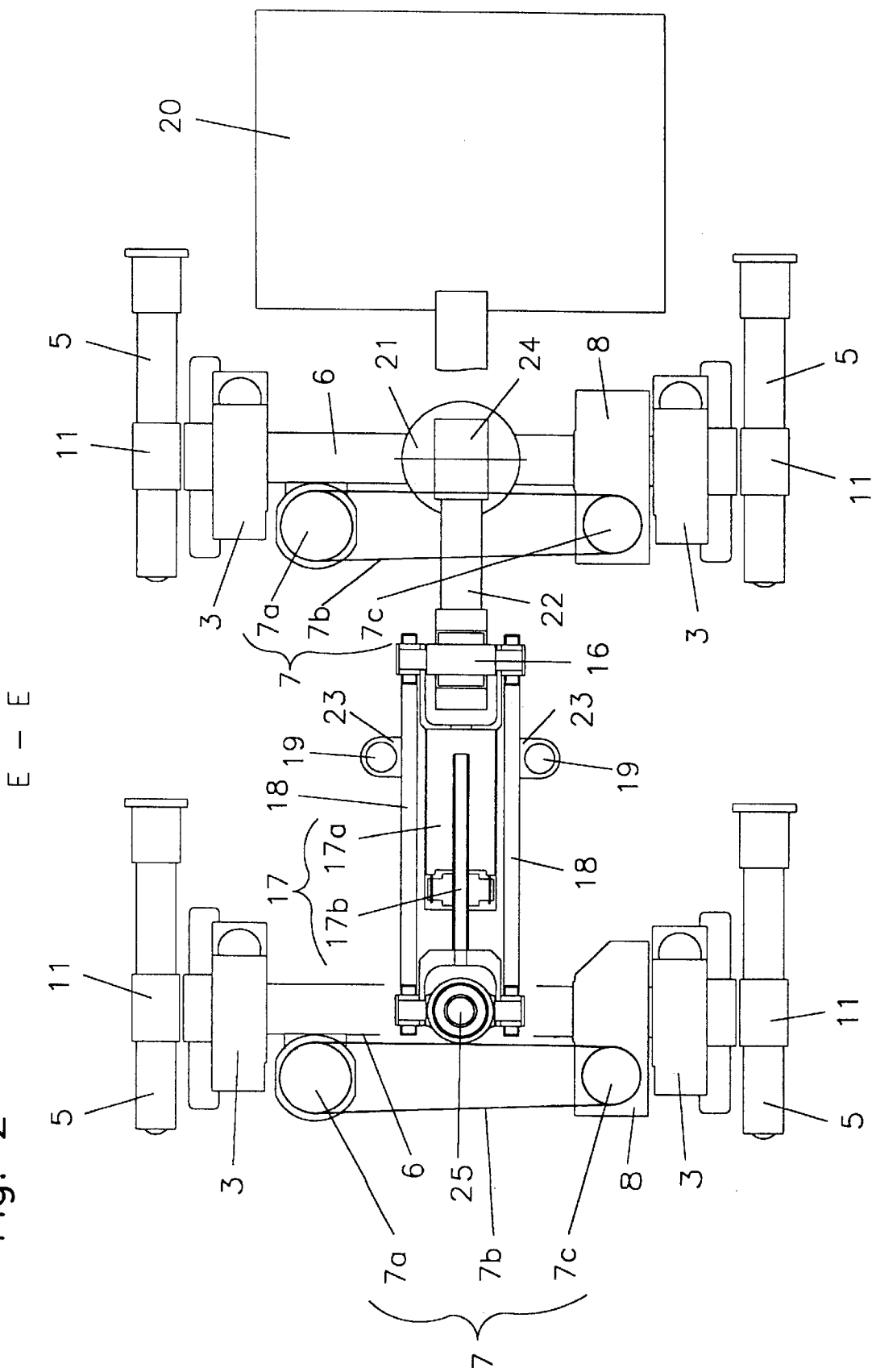
Figure 3:
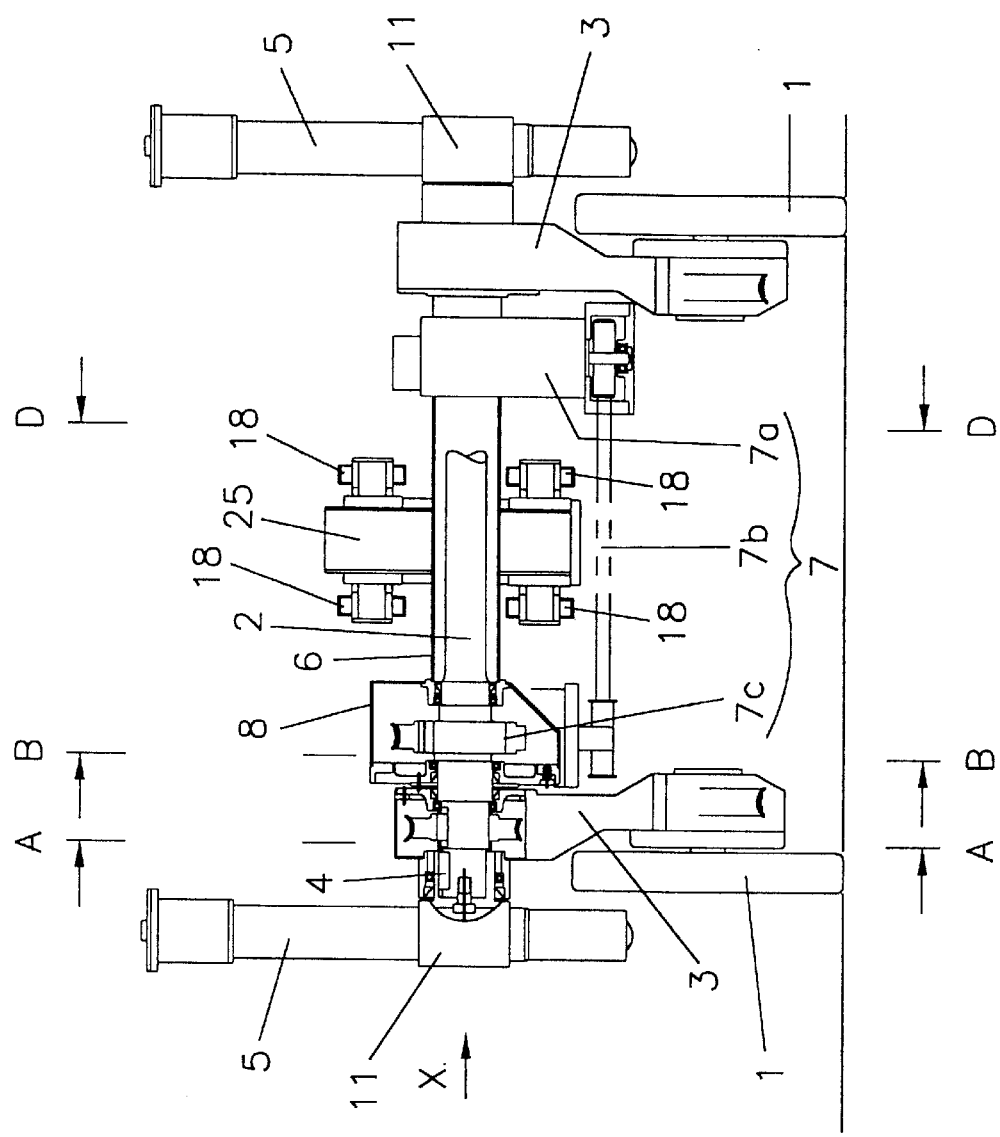
FIG. 3 is a partial sectional view taken along line C—C of FIG. 1.

The building components of the stair-climbing vehicle as shown in the drawings comprises four stair climbing modules, two axles interconnecting each two stair climb modules, a connecting structure disposed between the two axles and including a support structure for a seat and the seat. These building components will be explained on the basis of the schematic representations of FIGS. 1 to 4.

The four stair climbing modules each include a wheel 1, a wheel support arm 3 which is pivotally supported about a wheel support arm shaft 2 and a climbing arm 5, which is mounted on the support arm shaft 2 by a tongue and groove connection 4 for rotation with the shaft 2. The climb arm 5 is linearly extendable. The wheel 1 is supported on the wheel arm 3 eccentrically with respect to the wheel arm shaft 2.

In the embodiment presented, the wheel arm shaft 2 is shown as a rigid connection between two stair climbing modules. The wheel arm shaft 2 is rotatably supported in an axle tube 6, which extends between the two stair climbing modules so that the two stair climbing modules can pivot in unison. The drive for rotating the wheel arm shaft 2 in the axle tube 6 and for pivoting the two stair climbing modules, which will be called pivot drive 7, comprises a pivot drive motor 7a, a pivot arm toothed drive belt 7b and a pivot arm drive 7c (see FIG. 3) disposed in a drive housing 8. The drive housing 8 and the pivot drive motor 7a are firmly connected to the axle tube 6.

The wheel support arm 3, which is shown in FIG. 4b includes each a self-locking wheel drive 9 for rotating the wheels and a high transmission ratio, self-locking wheel support arm pivot drive 10 for the pivot movement of the wheel support arm around the wheel arm shaft 2. The wheel drive 9 and the wheel support arm pivot drive 10 each include an electric wheel drive motor 9a and, respectively, a wheel support arm pivot drive motor 10a, a wheel drive transmission 9b and, respectively, a wheel support arm pivot drive transmission 10b (see FIG. 4b). The transmissions are in the form of worm-gear and gear combinations.

The elongated climbing arm 5 of the chair climbing module, which is rigid and without a knee-joint and which is shown in greater detail in FIG. 4c, consists of a climbing arm receiver 11, which is rigidly connected to the wheel arm shaft 2, a climbing arm sleeve 12, which is supported on the climbing arm receiver, a climbing arm bolt which is supported in the climbing arm sleeve 12 so as to axially movable and extendable therefrom, and a climbing arm drive 14 for axially extending and retracting the climbing arm bolt 13 from the climbing arm sleeve 12. The climbing arm drive 14 is designed as a self-locking linear spool drive 14c comprising a climbing arm drive motor 14a, which transmits the necessary drive energy to the climbing arm spool drive 14c by way of a toothed belt 14b. The two climbing arms 5 of an axle are firmly interconnected by way of the wheel arm shaft 2 and can be pivoted around that axle only in unison.

The stair climbing modules provided in pairs for each axle are firmly connected to the axle tube 6 and by way of the front and rear control/steering head 21 and, respectively, 25, with the vehicle body. In the embodiment shown, the vehicle body consists of two parallelogram-like arms 15 and a linear drive 22, which is arranged adjacent the parallelogram arms structure 15 for an adaptation of the wheel base of the wheel climbing vehicle to the geometry of the stair to be negotiated. In order to accommodate a relatively small unevenness of the ground, one end of the linear drive 22 is supported in a bearing sleeve 24, which is disposed on the front steering head 21 so as to be pivotable about the longitudinal axis thereof.

The two parallelogram arms 15 as shown in FIG. 1 comprise each a short element 16 and the rear steering head 25 arranged in parallel therewith and two parallelograms 18, which are linked to the two components mentioned earlier. Furthermore, a column 19 for supporting a seat 20 is supported on each of the parallelogram arms 18 of the two parallelogram structures 15 by two joints 23 in such a way that the columns 19 are always parallel to the short element 16 and rear steering head 25 when the parallelogram arms pivot. During operation, an electric motor-operated control drive 17 arranged between the two parallelogram arm structures 15, which acts in a direction diagonal to the parallelogram structure geometry and which consists of a drive motor 17a and a drive motor worm gear transmission 17b (see FIG. 2) always provides for a vertical orientation of the columns 19.

All the electric drives are controlled and coordinated by a central control unit. The steering of the vehicle is passive, that is, steering movement is achieved exclusively by controlling the individual wheel drives 9. A drive for a steering movement at at least one of the steering heads 21 or 25 is not necessary. For a good straight-line movement of the vehicle on a level surface, the front-steering head 21 may be locked in a neutral position. Steering then occurs exclusively by the rear steering head 25.

Figure 5A:
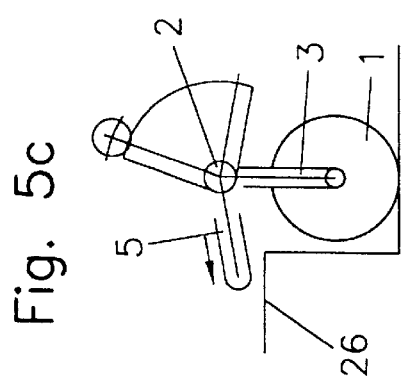
FIGS. 5a to 5f show schematically the individual steps in the movement of a stair-climbing module when negotiating a step.
Figure 5B:
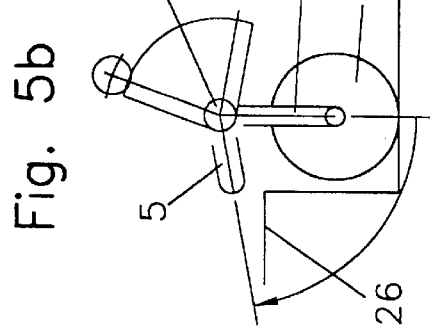
Figure 5C:
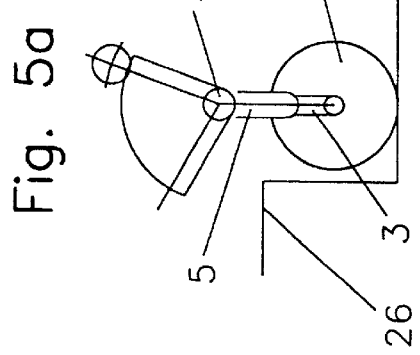
Figure 5D:
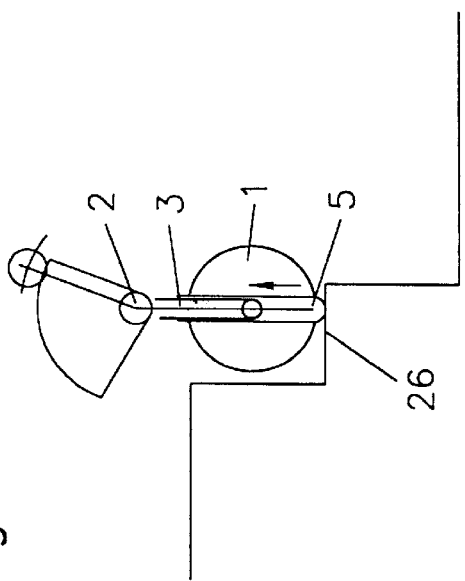
Figure 5E:
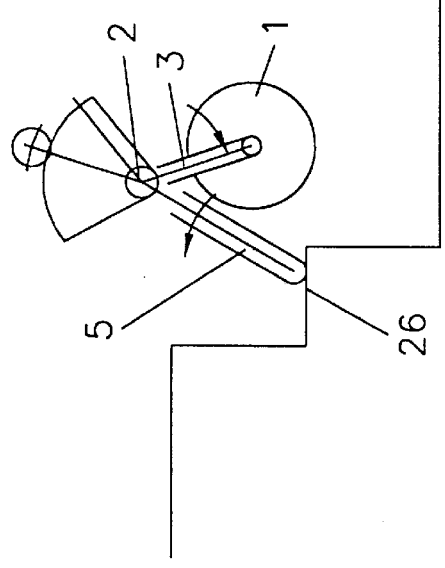
Figure 5F:
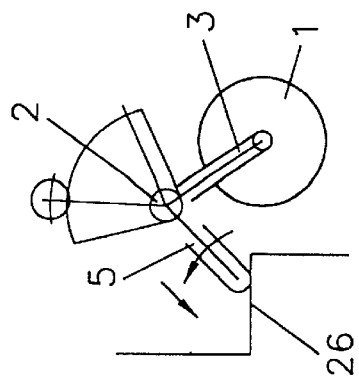

With the stair-climbing vehicle, single steps, as well as stairs with a step height of maximally 200 mm can be negotiated. The steps may have different heights. The wheel chair passenger residing on the seat 20 of the vehicle faces in a downstairs direction when ascending and also when descending the stairs or a step. The operation of the stair-climbing vehicle when negotiating steps and stairs will be described below on the basis of the schematic FIGS. 5a to 5f and 6a to 6c:

FIGS. 5a to 5f show the various partial climbing steps for a single stair climbing arm 5 during negotiation of a stair step 26 in an exemplary manner. First, the stair-climbing vehicle moves with the wheels 1 close to the step 26; the climbing arm 5 is retracted and the wheel support arm is in a vertical position (FIG. 5a). Then the climbing arm 5 is pivoted, with the wheel arm shaft 2 by means of the pivot drive 7, forwardly in the direction of stair climbing movement (FIG. 5b). The wheel arm 3, which is also supported on the wheel arm shaft 2 is maintained vertically by a relative counter pivot movement executed by the wheel arm pivot drive 10. Subsequently, the climbing arm 5 is extended by the climbing arm drive 14 (see FIG. 4c) until the climbing arm bolt 13 meets the step 26 (FIG. 5c). Then, in accordance with FIGS. 5d and 5e, the climbing arm 5 and the wheel arm 3 are pivoted about the contact point of the climbing arm 5 with the step 26 by the pivot drive 7, while the climbing arm 5 is fully extended to its maximum length. The climbing arm 5 and the wheel support arm 3 are then moved to a vertical position by the pivot drive 7 and the wheel support arm pivot drive 10 (see FIG. 5f). Finally, the climbing arm 5 is retracted in its vertical position parallel to the wheel support arm 3 so that the vehicle is supported by the wheels 1. During descent from a step, the various steps are executed in a reverse order.

FIGS. 6a to 6c show various positions of the stair-climbing vehicle during climbing. The normal procedure during climbing a normal stair with a step height of 170 mm and a step depth of 280 mm is shown in FIGS. 6a and 6b. First, the stair-climbing vehicle backs up to the step 26 (FIG. 6a) and then begins with the climbing procedure as shown in FIGS. 5a to 5f. The parallelogram structure 15 is controlled during the whole procedure in such a way that the columns 19 are always kept vertically. When the wheels of the second axle (front axle) reach the lowermost step, the wheel base of the stair climbing vehicle is adapted by the linear drive 22 individually to the stair geometry so that the stair climbing vehicle is capable of lifting all four wheels simultaneously over a step using all four climbing arms 5 at the same time (FIG. 6b).

Furthermore, with the embodiment of the stair-climbing vehicle as described, the stair-climbing vehicle according to the invention may climb small steps such as street curbs with a height of up to 8 cm while moving forwardly (FIG. 6c).

What is claimed is:

1. A stair-climbing vehicle for negotiating steps, ledges and stairs, comprising:
a vehicle body, wheel support arms supported on said vehicle body in spaced relationship so as to be pivotable about a wheel support arm shaft and having free ends, wheels rotatably supported on the free ends of said support arms, climbing arms supported on said vehicle body so as to be pivotable about said wheel support arm shaft and being linearly extendable, one wheel, one wheel support arm and one climbing arm forming together a stair climbing module.

2. A stair-climbing vehicle according to claim 1, wherein said stair climbing modules are arranged in sets of two which together form an axle so as to provide two axles which are linked together by a connecting element.

3. A stair-climbing vehicle according to claim 2, wherein said connecting element comprises an adjustable parallelogram structure.

4. A stair-climbing vehicle according to claim 2, wherein the length of said connecting element is adjustable by at least one extendable element so as to permit an adjustment of the wheelbase of said stair climbing vehicle.

5. A stair-climbing vehicle according to claim 3, wherein said parallelogram structure includes parallel arms on which at least one vertically arranged column is supported by bearing structures.

6. A stair-climbing vehicle according to claim 5, wherein a structure for supporting a load is mounted on the upper end of said at least one column.

7. A stair-climbing vehicle according to claim 6, wherein said structure for supporting a load is a seat.

8. A stair-climbing vehicle according to claim 1, wherein said stair climbing modules, said extendable element and said climbing arms include drive means all being controlled by a central processing unit which coordinates the operation of said drive means.

9. A stair-climbing vehicle according to claim 1, wherein the wheels of said stair-climbing are individually operated and controlled for steering said vehicle.

* * * * *